(No Model.)

D. G. WEEMS.
ARTIFICIAL STONE.

No. 244,348.          Patented July 12, 1881.

WITNESSES.

INVENTOR

David G. Weems.

BY

ATTORNEY.

United States Patent Office.

David G. Weems, of Baltimore, Maryland.

ARTIFICIAL STONE.

SPECIFICATION forming part of Letters Patent No. 244,348, dated July 12, 1881.

Application filed April 12, 1881. (No model.)

*To all whom it may concern:*

Be it known that I, DAVID G. WEEMS, of Baltimore city, State of Maryland, have invented certain new and useful Improvements in Artificial Stone; and I hereby declare the same to be fully, clearly, and exactly described as follows, reference being had to the accompanying drawings, in which—

Figure 1:
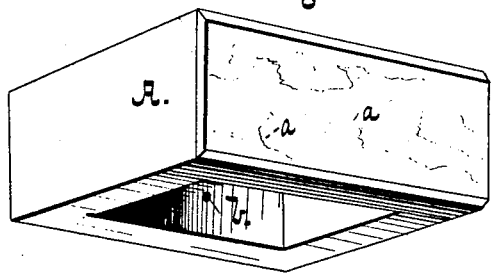
Figure 2:
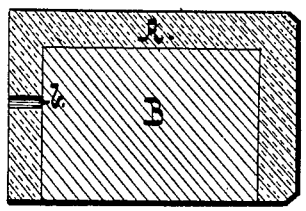

Figure 1 is a perspective view of a block of artificial stone embodying my present invention, and Fig. 2 is a transverse sectional view of the same.

My invention relates to the manufacture of artificial stone for building purposes; and it has for its object to provide a stone or building-block embodying in maximum degree the attributes of lightness and strength, while being incidentally of such construction as to lessen the liability of injury or danger from fire and afford facility for the drying of the stone-composition.

In practice I prepare a solution as follows: To fifty gallons of water I add three and one-half gallons of lime-water, one pint of saturated solution of silicate of soda or potash, two pounds of magnesia, six ounces of potassium tartrate, one and one-half pound each of alum, borax, and litharge, and one quart of Venice turpentine. These are thoroughly mixed together, and the solution is used to moisten a mixture of about one part of Portland or other standard cement and three parts of fine sand. Where extra strength is required the proportion of cement is increased. The dampened mixture of cement and sand is then tamped and pressed in suitable molds so as to form a hollow block, A, open at one side, which is placed lowermost in building. In the walls is formed one or more apertures, $b$, which subserve an important end. The stone being allowed to set and thoroughly dry, is ready for the application of the face-graining $a$, if any is to be used. To apply it I moisten raw silk with the desired color in solution, and after drawing the fibers out to form a sort of irregular net-work, the same is laid on the surface of the stone, which absorbs the color, when the fibers are removed. Instead of this graining I may finish the face of the stone by sanding, in which case I add to one gallon of the solution above described about one quart of linseed-oil and about one-fourth of a pint of turpentine, thoroughly mixing them, with or without a pigment, as may be desired. The mixture is applied to the face of the stone until it will receive no more, when I apply any suitable sand in the usual way with the bellows. The treatment of the stone has the double effect of increasing its hardness and of causing a firm adhesion thereto of the sand. Where additional strength is desired the interior of the stone is filled with a suitable mixture, B, of sand and cement, either before or subsequent to the drying of the block.

While I have described the solution I use as composed of certain ingredients in certain proportions, I do not limit myself absolutely thereto, as certain of the ingredients may be omitted without materially impairing the result. The essential ingredients of the solution are alum, borax, litharge, and Venice turpentine, and the others, while useful in connection therewith, may be omitted, if desired.

Certain of the advantages of my artificial stone may well be mentioned, bearing in mind the fact that homogeneity of the contents of the block is only desirable as conducive to durability under changes of temperature and is far less important than surface hardness. To resist abrasion from the effect of moisture and frost or mechanical causes, I construct my block in the form of a hollow casing having strong and hard walls, which casing may, if desired, be filled with the same or an inferior composition. Except in the case of quite large blocks the interior need not, and indeed should not, be filled; for, remembering the mechanical law that strength increases as area—*i. e.*, as the square of a dimension, while stress increases as the cube of a dimension—when the dimensions are small but little increased strength would be secured by making the block solid. Any advantage in point of increased strength would be far more than outweighed by destroying the advantages due to the hollow block, some of which may well be mentioned: The air-spaces in the interior of the blocks practically provide a double wall for the building in which the blocks are used, and render the inside temperature uniform; the danger of fire is also lessened by reason of the diminished conductivity of the blocks, while the holes *b* allow of the escape of the air as it is expanded or contracted by heat or cold, and obviate all danger of bursting the blocks.

I am aware that building-blocks have been faced with metal and with porcelain or other vitrifiable material, and such I do not claim.

What I claim is—

1. A building-block made hollow and provided with an air-vent, as set forth.

2. A building-block consisting of a hollow shell of a suitable plastic composition, open on one side and having a lateral perforation, as set forth.

3. The composition for building-blocks, consisting of cement and sand moistened with a solution containing alum, borax, litharge, and Venice turpentine, as set forth.

4. The method herein described of surface-graining artificial stone, consisting in moistening a web of raw silk in coloring-matter, pulling the wet strands apart and placing them on the porous face of the stone, and removing the strands when the color is absorbed, whereby their color is imparted to the block in veins, as set forth.

5. The method herein described of hardening and surface-finishing an artificial building-block, consisting in saturating its surface with the composition set forth, and finally sanding, substantially as described.

DAVID G. WEEMS.

Witnesses:
SYDNEY J. SNOW,
GEO. A. HIMMICK.